United States Patent
Hoess et al.

(10) Patent No.: US 10,889,177 B2
(45) Date of Patent: Jan. 12, 2021

(54) DRIVE APPARATUS HAVING A CLUTCH DEVICE, DRIVE SYSTEM HAVING SAID DRIVE APPARATUS AND METHOD FOR OPERATING THE DRIVE SYSTEM

(71) Applicant: Bayerische Motoren Werke Aktiengesellschaft, Munich (DE)

(72) Inventors: Bernhard Hoess, Munich (DE); Thomas Jung, Munich (DE); Sebastian Kobler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/585,057

(22) Filed: Sep. 27, 2019

(65) Prior Publication Data
US 2020/0023725 A1 Jan. 23, 2020

Related U.S. Application Data

(63) Continuation of application No. PCT/EP2018/056917, filed on Mar. 20, 2018.

(30) Foreign Application Priority Data

Apr. 6, 2017 (DE) .......................... 10 2017 205 942

(51) Int. Cl.
*B60K 6/48* (2007.10)
*B60K 6/387* (2007.10)
(Continued)

(52) U.S. Cl.
CPC ................ *B60K 6/387* (2013.01); *B60K 6/48* (2013.01); *B60K 6/547* (2013.01);
(Continued)

(58) Field of Classification Search
CPC .......... B60K 6/387; B60K 6/48; B60K 6/547; B60K 2006/4825; F16D 11/00;
(Continued)

(56) References Cited

U.S. PATENT DOCUMENTS 4,384,240 A * 5/1983 Sloan ...................... H02P 7/281
318/139
4,547,678 A * 10/1985 Metzner .................. B60L 50/16
290/40 C
(Continued)

FOREIGN PATENT DOCUMENTS

DE 44 34 019 A1 4/1995
DE 100 25 853 A1 4/2001
(Continued)

OTHER PUBLICATIONS

International Search Report (PCT/ISA/210) issued in PCT Application No. PCT/EP2018/056917 dated Jun. 12, 2018 with English translation (seven (7) pages).
(Continued)

*Primary Examiner* — Bryan A Evans
(74) *Attorney, Agent, or Firm* — Crowell & Moring LLP

(57) ABSTRACT

A drive apparatus for a hybrid vehicle has an internal combustion engine, which has a crankshaft for outputting a drive power, and a torsional vibration reduction device, which is designed to reduce torsional vibrations and to transfer drive power from the crankshaft in the direction of a drivable wheel of the motor vehicle. A clutch device has a clutch input side, a clutch output side, a form-fit clutch and a frictional clutch. The torque transfer from the clutch input side to the clutch output side and thus from the crankshaft to the drivable wheel can be selectively produced, wherein the torque transition from the clutch input side to the clutch output side is enabled as soon as at least one of the two clutches is closed. The torsional vibration reduction device
(Continued)

is arranged after the clutch device, relative to the torque transmission from the crankshaft in the direction of the drivable wheel. The clutch input side is connected to the crankshaft for conjoint rotation and the clutch output side is connected to the torsional vibration reduction device for conjoint rotation.

13 Claims, 1 Drawing Sheet

(51) Int. Cl.
*B60K 6/547* (2007.10)
*F16D 11/00* (2006.01)
*F16D 13/52* (2006.01)
*F16D 21/00* (2006.01)

(52) U.S. Cl.
CPC ...... *B60K 2006/4825* (2013.01); *F16D 11/00* (2013.01); *F16D 13/52* (2013.01); *F16D 21/00* (2013.01); *F16D 2300/14* (2013.01); *F16D 2300/22* (2013.01)

(58) Field of Classification Search
CPC ...... F16D 13/52; F16D 21/00; F16D 2300/14; F16D 2300/22
See application file for complete search history.

(56) References Cited

U.S. PATENT DOCUMENTS

| | | | | |
|---|---|---|---|---|
| 6,076,899 | A * | 6/2000 | Isella | B60L 7/24 188/159 |
| 2002/0177504 | A1* | 11/2002 | Pels | B60K 6/387 477/3 |
| 2011/0088958 | A1* | 4/2011 | Ebert | B60K 6/48 180/65.22 |
| 2012/0234641 | A1* | 9/2012 | Petzold | F16D 25/0635 192/48.5 |
| 2017/0326962 | A1* | 11/2017 | Aringsmann | F16D 13/24 |

FOREIGN PATENT DOCUMENTS

| | | |
|---|---|---|
| DE | 102 09 514 A1 | 10/2002 |
| DE | 10 2007 050 235 A1 | 4/2009 |
| DE | 10 2009 047 766 A1 | 6/2011 |
| DE | 10 2015 211 436 A1 | 1/2016 |
| DE | 10 2015 201 931 A1 | 8/2016 |
| EP | 2 311 680 A2 | 4/2011 |

OTHER PUBLICATIONS

German-language Written Opinion (PCT/ISA/237) issued in PCT Application No. PCT/EP2018/056917 dated Jun. 12, 2018 (five (5) pages).

German-language Office Action issued in counterpart German Application No. 10 2017 205 942.7 dated Nov. 17, 2017 (five (5) pages).

* cited by examiner

DRIVE APPARATUS HAVING A CLUTCH DEVICE, DRIVE SYSTEM HAVING SAID DRIVE APPARATUS AND METHOD FOR OPERATING THE DRIVE SYSTEM

CROSS REFERENCE TO RELATED APPLICATIONS

This application is a continuation of PCT International Application No. PCT/EP2018/056917, filed Mar. 20, 2018, which claims priority under 35 U.S.C. § 119 from German Patent Application No. 10 2017 205 942.7, filed Apr. 6, 2017, the entire disclosures of which are herein expressly incorporated by reference.

BACKGROUND AND SUMMARY OF THE INVENTION

The invention relates to a drive apparatus having a clutch device with a positive-locking clutch and a frictional-locking clutch, and also to a drive system having such a drive apparatus, as well as a method for operating said drive system. An apparatus of this type is known from the prior art, in particular from DE 10 2015 201 931 A1.

The invention is described below with reference to a hybrid vehicle drive train, this is not to be understood as a limitation of the invention. In the case of such a drive train, an internal combustion engine and an electromechanical energy converter are combined in order to drive the motor vehicle. In particular, in order to be able to utilize the efficiency advantages and other advantages of such a concept, the operation is necessary in different operating points of the different drive machines. In order to actuate the internal combustion engine and the electromechanical energy converter in the mentioned manner, it has proven advantageous to use particular clutch apparatuses.

DE 10 2015 201 931 A1 proposes a clutch system having a positive-locking clutch and a frictional-locking clutch, which are connected in parallel with regard to the transmission of torque.

One object of the invention is to provide a drive apparatus having a clutch device having an improved ability to control the drive apparatus, and also a drive system having such a drive apparatus and a method for operating said drive system.

In the context of the invention, the term "a drive apparatus" is to be understood as a device for driving a motor vehicle, in particular in other words a vehicle for transporting passengers, a so-called car. The drive apparatus is provided for the purpose of providing drive power (rotational speed, torque) for overcoming driving resistances (air resistance, frictional resistance, incline resistance, acceleration resistance etc.) of this motor vehicle.

In the context of the invention, the term "internal combustion engine" is to be understood as a thermal engine having internal combustion, in particular in a reciprocating piston construction. It is preferred that the term "internal combustion engine" is to be understood as a reciprocating piston internal combustion engine, which may be operated according to the Otto principle or Diesel principle. In order to output a drive power (rotational speed, torque) this internal combustion engine comprises a so-called crankshaft. In dependence upon the system, the drive power that is output by such an internal combustion engine is afflicted with oscillations, in particular torque oscillations, so-called torsional oscillations. Oscillations of this type are generally undesirable and the drive apparatus comprises a torsional oscillation reducing device in order to reduce these oscillations.

In the context of the invention, the term "torsional oscillation reducing device" is to be understood as a device for reducing torsional oscillations of the drive power that is output by the internal combustion engine. Torsional oscillation reducing devices of this type are known from the prior art in different constructions, in particular these torsional oscillation reducing devices are known as torsional oscillation dampers or torsional oscillation absorbers or as a combined device, which comprises both a torsional oscillation damper as well as a torsional oscillation absorber. In particular, a dual mass flywheel is a torsional oscillation reducing device of this type known from the prior art. In this case, a large number of further torsional oscillation reducing devices, which may likewise be used with this drive apparatus, are known from the prior art.

The drive power that is provided by the internal combustion engine in order to drive the motor vehicle is guided from a drive train of the motor vehicle to a drivable wheel and is transferred by this drivable wheel to the road surface.

In the context of the invention, the term "drivable wheel" is to be understood as a wheel-tire combination of the motor vehicle. The motor vehicle preferably comprises multiple drivable wheels, preferably one or multiple drivable axles, wherein two of these drivable wheels are arranged on a drivable axle.

In the case of such a drive apparatus, in dependence upon the system a device for interrupting or producing the traction or the transmission of torque is to be provided between the crankshaft and the drivable wheel. A clutch device having a clutch input side and a clutch output side is therefore provided in order to selectively interrupt or produce the transmission of torque from the crankshaft to the drivable wheel.

In the context of the invention, the term "such a clutch device" is to be understood as a device, which comprises the clutch input side and the clutch output side, wherein the transmission of torque from the clutch input side to the clutch output side may be selectively interrupted or produced. The clutch device comprises a frictional-locking clutch and a positive-locking clutch for interrupting and producing the transmission of torque between the clutch input side and the clutch output side. In this case, a transmission of torque may be selectively interrupted or produced using the frictional-locking clutch as well as using the positive-locking clutch. The clutch input side may be selectively coupled to the clutch output side by means of the positive-locking clutch and the frictional-locking clutch in order to produce this transmission of torque.

The frictional-locking clutch comprises a frictional connection for interrupting or producing this transmission of torque. The positive-locking clutch comprises a positive-locking connection for interrupting or producing this transmission of torque.

These two clutches (frictional-locking clutch, positive-locking clutch) are respectively both non-rotatably connected to the clutch input side as well as to the clutch output side, in particular these clutches are in other words connected in parallel with regard to the transmission of torque, with the result that it is rendered possible to transmit torque from the clutch input side to the clutch output side as soon as one of the two clutches (frictional-locking clutch or positive-locking clutch) is closed, even if the other of the two clutches is open.

In the case of conventional drive apparatuses, a device for reducing the torsional oscillations is arranged between the crankshaft of the internal combustion engine and the conventional clutch device, in accordance with the invention this arrangement is changed and the clutch input side is non-rotatably, preferably directly non-rotatably, connected to the crankshaft and the clutch output side is non-rotatably, preferably directly non-rotatably, connected to the torsional oscillation reducing device, in particular to an input side of the torsional oscillation reducing device (reducer input side). In particular, by virtue of this embodiment of the drive apparatus the torsional oscillation reducing device with regard to the transmission of torque from the crankshaft to the drivable wheel is arranged after or directly downstream of the clutch device.

In the context of the invention, a non-rotatable connection means that the components or devices that are connected to one another in this manner comprise the same axis of rotation when transmitting the drive power and rotate with the same rotational speed and preferably, at least essentially, are torsionally rigidly connected to one another, in particular by means of a shaft-hub connection. It is further preferred that "directly non-rotatable" in this sense means that components that are connected to one another in this manner directly contact one another or are embodied preferably as a single part with one another.

A particularly advantageous control of the drive system is rendered possible using the proposed drive system. In particular, the rotating mass that is to be accelerated in order to start the internal combustion engine is small since the torsional oscillation reducing device may be decoupled from the crankshaft via the clutch device. In the event of a pulse start, in which the internal combustion engine is brought from a standstill to a starting rotational speed and is then transferred into the fired operation, this low rotating mass is advantageous. Furthermore, in particular owing to the parallel connection of the two clutches (frictional-locking clutch, positive-locking clutch) firstly a large torque may be transmitted and secondly the two clutches may be designed to different requirements.

In a preferred embodiment of the invention, the positive-locking clutch is embodied as a zero backlash positive-locking clutch with the result that in the closed state of this clutch drive torque may be transmitted with zero backlash from the crankshaft to the clutch output side. In particular, owing to the fact that the clutch device is arranged upstream of the torsional oscillation reducing device, the clutch device is influenced with a non-uniform drive torque, it has been shown that it is advantageous in relation to the serviceable life and in particular also in relation to noise when transmitting the drive torque if the positive-locking clutch is embodied as a zero backlash positive-locking clutch.

In a further preferred embodiment, the positive-locking clutch is embodied as a gear clutch. In particular, in the case of a gear clutch a gear tooth profile is provided in order to form the positive-locking connection that may be produced selectively and said gear tooth profile selectively engages into a suitable mating profile or if this torque-conducting connection is not produced, does not engage into this suitable mating profile.

It is preferred that in order to produce a torque-conducting connection between the clutch input side and the clutch output side a positive-locking element may be moved by means of a positive-locking actuator in the positive-locking clutch. It is preferred that the positive-locking element is embodied at least essentially in a conical manner at least in sections and in particular at least in sections in a region, which is configured so as to form the torque-conducting connection. In particular by means of a conical positive-locking element it is possible in a simple manner to represent a positive-locking connection that may be produced selectively. In particular, the zero backlash in the positive-locking clutch is realized by virtue of a particular design of the positive-locking element and also in particular by virtue of an elastic connection of the positive-locking element in an actuating direction or movable parts of this positive-locking element on the positive-locking actuator. The positive-locking element is pre-stressed in the closed position (torque may be transmitted), and the transmission of torque is rendered possible with zero backlash using the positive-locking clutch, in particular by means of the elastic connection to the positive-locking actuator.

It is preferred that the frictional-locking clutch and the positive-locking clutch may be actuated independently of one another and for control purposes comprise a frictional-locking actuator and the positive-locking actuator. A flexibly controllable drive apparatus may be represented in particular by means of an independent ability to control the clutches (frictional-locking clutch, positive-locking clutch). It is preferred that the frictional-locking clutch and the positive-locking clutch may be controlled by means of a common actuator, in particular the positive-locking actuator. A simple construction of the drive apparatus is rendered possible in particular by means of a common actuator.

It is preferred that at least one of the actuators and preferably all the actuators are embodied as electromagnetic, electromechanical, pneumatic or hydraulic actuators.

In a preferred embodiment, the positive-locking clutch is embodied as a so-called self-retaining clutch. Self-retaining clutches are known as such from the prior art. In particular, in the case of a self-retaining clutch forces that are to be applied externally to this self-retaining clutch are not necessary in order to hold the clutch in a closed operating state, in particular in the case of a self-retaining clutch an actuating force is triggered in the closed state by means of the drive torque that is to be transmitted, said actuating force retaining this clutch in the closed state (torque may be transmitted).

In one preferred embodiment of the invention, the frictional-locking clutch is embodied as a single disk clutch or multi-disk clutch having at least one or preferably a plurality of frictional lamellae for transmitting torque. In this case, the at least one frictional lamellae is embodied so as to form the frictional connection for the selective transmission of torque using this frictional-locking clutch. In particular single disk clutches and multi-disk clutches have proven to be particularly reliable clutches in automotive engineering.

In one preferred embodiment of the invention, the positive-locking clutch is embodied as a so-called "normally closed" clutch and the frictional-locking clutch is embodied as a so-called "normally open" clutch. In this case, a "normally closed clutch" is to be understood in such a manner that in the unactuated state, in particular in other words if an external actuating force is not applied to this clutch, this clutch is in a closed operating state in which a torque may be transmitted using this normally closed clutch. A "normally open clutch" in this case is to be understood in such a manner that in the unactuated state, in particular in other words if an external actuating force is not applied to this clutch, this clutch is in an opened operating state in which torque cannot be transmitted using this normally open clutch. It is possible, in particular by means of an embodiment of this type of the clutch device, to control the drive apparatus in an energy efficient manner since the normally closed clutch is regularly closed without expending energy and the normally open clutch may be controlled when required for this purpose or is in an opened state without expending energy.

In one preferred embodiment of the invention, a maximum frictional-locking torque may be transmitted using solely the frictional-locking clutch. Furthermore, a maximum positive-locking torque may be transmitted using solely the positive-locking clutch. In this case, "solely" in this sense in relation to the clutch device means that respectively only one of the two clutches (positive-locking clutch, frictional-locking clutch) is closed and the respective other clutch is opened with the result that the torque is transmitted from the clutch input side to the clutch output side solely by means of the closed clutch alone.

It is preferred that the positive-locking clutch and the frictional-locking clutch are designed in such a manner that this positive-locking torque is greater than this frictional-locking torque. In the case of the proposed embodiment of the drive system in which the clutch device is directly connected to the crankshaft, a particularly large torque, a so-called ignition torque of the internal combustion engine, acts upon this clutch device.

This ignition torque or the magnitude of this ignition torque is in particular caused by means of the combustion of a fuel-air mixture in a combustion chamber of the internal combustion engine and owing to the small rotating mass of the internal combustion engine, which is to be accelerated. Since the positive-locking clutch is closed over wide operating phases of the drive apparatus, in particular if drive power is provided by the internal combustion engine for the drive of the motor vehicle, it is particularly advantageous to embody this positive-locking clutch as a normally closed clutch and further preferably to enable this normally closed clutch to transmit the ignition torque, in other words to design said normally closed clutch for transmitting this ignition torque using solely the positive-locking clutch.

Furthermore, it is preferred to advantageously design the frictional-locking clutch for a starting torque of the internal combustion engine, wherein the term "starting torque" is to be understood as the torque that is output if the crankshaft of the internal combustion engine is accelerated during a starting procedure, in particular during a pulse start or towing start, preferably from a standstill, in order to be transferred from the non-fired state (no fuel is burnt) into the fired state (fuel is burnt). In this case, this starting torque is lower than the ignition torque and may be represented as a particularly compact clutch device, in particular by means of such a design of the clutches (positive-locking clutch, frictional-locking clutch).

In one preferred embodiment, the torsional oscillation reducing device comprises a primary side and a secondary side. The primary side is connected to the secondary side in a torsionally flexible manner, in particular in order to reduce torsional oscillations, in this case at least one resilient device is provided for the torsionally flexible coupling arrangement. In particular, in the case of a dual mass flywheel, the so-called primary mass is embodied as the primary side and the secondary mass is embodied as the secondary side and these primary and secondary masses are connected to one another in a torsionally flexible manner by means of a resilient device. The output side of the clutch device is preferably non-rotatably, preferably directly non-rotatably, connected to the primary side of the torsional oscillation reducing device. In particular, it is possible by means of an embodiment of this type of the drive apparatus to realize a particularly space-saving construction.

In a further preferred embodiment of the invention, the clutch output side is preferably embodied as a single part with the primary side of the torsional oscillation reducing device and the clutch output side is preferably integrated into the primary side of the torsional oscillation reducing device. In particular, a further reduction of the installation space requirement may be realized by means of such an embodiment.

Furthermore, a drive system for a hybrid vehicle is provided, which comprises a drive apparatus in accordance with the first claim. Furthermore, this drive system comprises a separating clutch, an electromechanical energy converter that is embodied as a drive motor in order to provide drive power for the drive of the vehicle, in particular in other words a so-called traction motor, and a shiftable transmission. The term "a shiftable transmission" in this sense is to be understood as a speed change gearbox having at least two different shiftable transmission ratios between a transmission input shaft and a transmission output shaft.

With regard to the transmission of torque in the direction from the crankshaft of the internal combustion engine to the drivable wheel, the electromechanical energy converter is arranged upstream of the shiftable transmission and downstream of the torsional oscillation reducing device.

The separating clutch is preferably configured so as to selectively interrupt the transmission of torque from the crankshaft to the drivable wheel and is furthermore preferably arranged between the electromechanical energy converter and the torsional oscillation reducing device. In particular, it is possible by means of this arrangement to interrupt the transmission of torque from the crankshaft to the electromechanical energy converter by means of the separating clutch, in particular in the case of an opened separating clutch an electric driving mode is rendered possible in which the internal combustion engine is at a standstill and is consequently loss-free.

In one preferred embodiment of the invention, a transmission clutch is arranged in the shiftable transmission. In this case, this transmission clutch is configured so as to selectively interrupt the torque-conducting connection between the transmission input shaft and the transmission output shaft. In the case of a shiftable transmission of this type, the transmission ratio between the transmission input shaft and the transmission output shaft may be preferably changed continuously or may be changed in discrete steps, so-called gears. It is consequently possible using the transmission clutch to selectively interrupt in particular the torque-conducting connection between the electromechanical energy converter and the drivable wheel. In particular, further operating modes of the drive system may be represented by means of a transmission clutch of this type.

Furthermore, a method for operating a drive system in accordance with claim 10 is proposed. In this method, it is proposed during a pulse start of the internal combustion engine to transfer the frictional-locking clutch into a closed state or to hold it in this closed state and during this pulse start, in particular whilst accelerating the crankshaft, to transfer the positive-locking clutch into an opened state or to at least temporarily or permanently hold it in this opened state. In this case, in this sense the term "a pulse start" is to be understood as a starting procedure of the internal combustion engine in which the crankshaft is accelerated from a standstill to a starting rotational speed utilizing kinetic energy, in particular kinetic energy that is stored in the torsional oscillation reducing device.

In the context of the invention, the term "an opened state of the positive-locking clutch or the frictional-locking clutch" is to be understood as a state of these clutches in which as planned a torque may not be transmitted using the opened clutch. Furthermore, the term "a closed state" is understood to mean a state of this clutch in which as planned a torque may be transmitted using said clutch.

In the context of the invention, the term "a starting rotational speed of the internal combustion engine" is to be understood as a rotational speed above which this internal combustion engine may be transferred from the unfired operation (no fuel is burnt in combustion chambers of the internal combustion engine) into a fired operation (fuel is burnt in combustion chambers of the internal combustion engine and this internal combustion engine is ready to output a drive power). The starting rotational speed in this case may be determined in dependence upon the construction/type of the internal combustion engine and may be determined in a computerized manner or using technical tests. It is preferred that during the pulse start, the electromechanical energy converter is also drawn upon to provide an accelerating torque for the crankshaft. In particular, it is possible by means of such a starting method to advantageously utilize the slip characteristic of the frictional-locking clutch to accelerate the internal combustion engine and to realize a more convenient and rapid starting procedure.

In a fired operation of the internal combustion engine in which drive power may be output or is output from the crankshaft in the direction of the drivable wheel, the positive-locking clutch is transferred into a closed operating state or is held in this closed operating state. In particular using the positive-locking clutch, large torques (ignition torque) may be transmitted and in particular after the internal combustion engine is accelerated to the starting rotational speed, the positive-locking clutch may be simply closed and thus a reliable operating method may be realized.

In one preferred embodiment of the method for operating the internal combustion engine, the frictional-locking clutch is transferred at least temporarily or permanently into an opened state or said frictional-locking clutch is held permanently in this state during the fired operation of the internal combustion engine.

In particular if the positive-locking clutch is embodied as a normally closed clutch and the frictional-locking clutch is embodied as a normally open clutch, during a driving operation in which the internal combustion engine provides drive power for driving the motor vehicle, power is consequently not necessary in order to maintain the torque-conducting connection between the clutch input side and the clutch-output side and a more efficient operation of the drive system is rendered possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
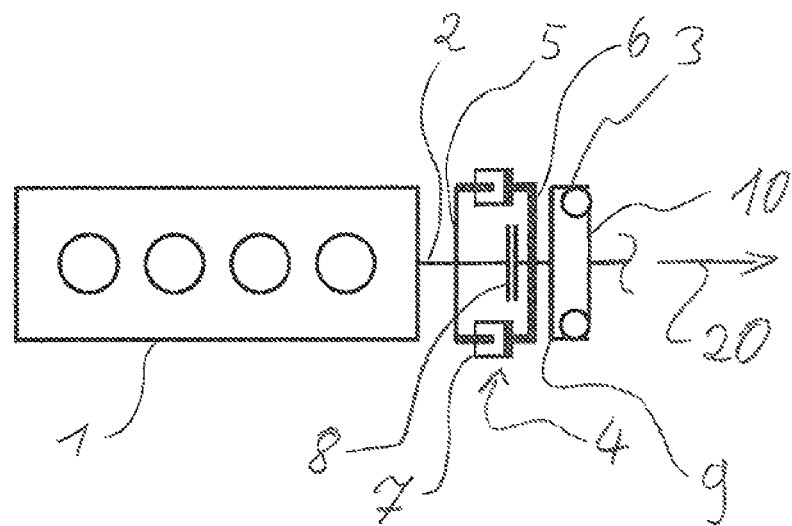
FIG. 1 illustrates schematically a drive apparatus according to an embodiment of the invention.

FIG. 1 illustrates schematically a drive apparatus. This drive apparatus comprises an internal combustion engine 1, which is embodied in a reciprocating piston construction, having a crankshaft 2. The crankshaft 2 is non-rotatably connected to the clutch input side 5 of the clutch device 4. The clutch output side 6 of the clutch device 4 is non-rotatably connected to the primary side 9 of the torsional oscillation reducing device 3 that is embodied as a dual mass flywheel. The secondary side 10 of the torsional oscillation reducing device 3 is configured so as to output drive power, which is provided by the crankshaft 2, so as to drive the motor vehicle, in the direction 20 of a drive axle having at least one drivable wheel.

Figure 2:
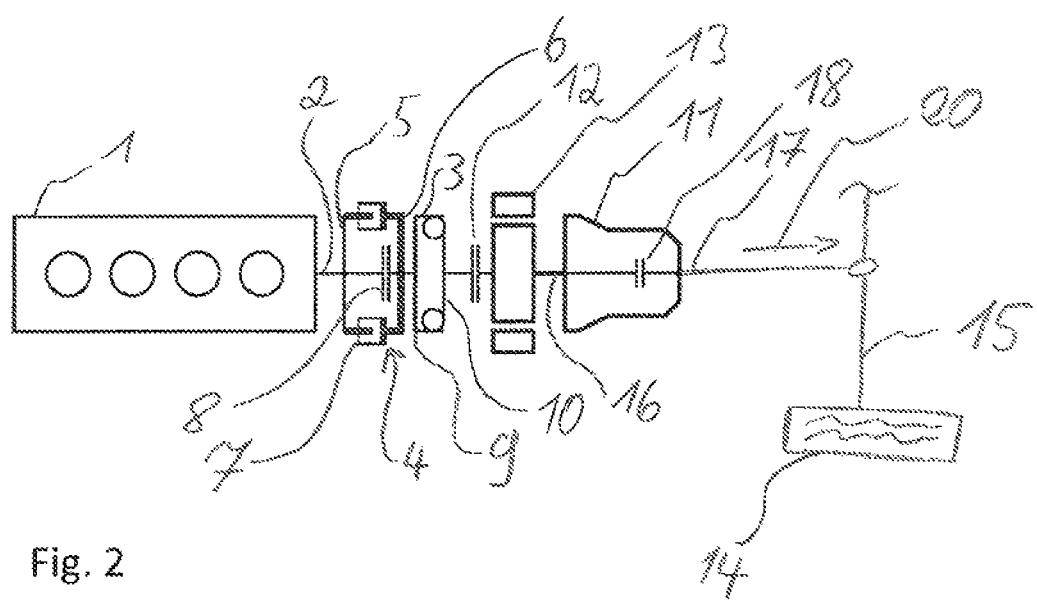
FIG. 2 illustrates schematically a drive system having an electric machine and such a drive apparatus.

FIG. 2 illustrates schematically a drive system. This drive system comprises the drive apparatus that is disclosed in FIG. 1. Furthermore, this drive system for a hybrid vehicle comprises a separating clutch 12 for selectively interrupting the transmission of torque from the secondary side 10 of the torsional oscillation reducing device 3 to the electromechanical energy converter 13 that is embodied as an electric motor/generator. The electromechanical energy converter 13 is configured so as to provide a drive power for the hybrid vehicle and in this case is non-rotatably connected to the transmission input shaft 16 of the shiftable transmission 11.

The shiftable transmission 11 is illustrated in a greatly simplified embodiment, transmissions of this type are known in different constructions from the prior art, some of these constructions are by way of example planetary gear transmissions or automatic transmissions having one or multiple epicyclic gear wheel sets, dual clutch transmissions or a manual shifting transmission and the like.

The shiftable transmission 11 comprises the transmission output shaft 17 in addition to the transmission input shaft 16. In order to interrupt the torque-conducting connection between the transmission input shaft 16 and the transmission output shaft 17, the shiftable transmission 11 comprises the transmission clutch 18. It is rendered possible using the transmission clutch 18 to selectively interrupt the transmission of torque from the transmission input shaft 16 to the transmission output shaft 17. The drive power that is provided by the internal combustion engine 1 or the electromechanical energy converter 13 may be transferred from the transmission output shaft 17 in the direction 20 of the drive axle 15 having the drivable wheel 14.

| List of reference numerals: | |
|---|---|
| 1 | Internal combustion engine |
| 2 | Crankshaft |
| 3 | Torsional oscillation reducing device |
| 4 | Clutch device |
| 5 | Clutch input side |
| 6 | Clutch output side |
| 7 | Positive-locking clutch |
| 8 | Frictional-locking clutch |
| 9 | Primary side of 3 |
| 10 | Secondary side of 3 |
| 11 | Shiftable transmission |
| 12 | Separating clutch |
| 13 | Electromechanical energy converter |
| 14 | Drivable wheel |
| 15 | Drive axle |
| 16 | Transmission input shaft |
| 17 | Transmission output shaft |
| 18 | Transmission clutch |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive apparatus for a hybrid vehicle having an internal combustion engine, comprising:
   a crankshaft for outputting a drive power;
   a torsional oscillation reducing device, which is configured so as to reduce torsional oscillations and so as to transmit drive power from the crankshaft in a direction of a drivable wheel of the motor vehicle; and
   a clutch assembly having a clutch input side, a clutch output side, a positive-locking clutch and a frictional-locking clutch, wherein
   the transmission of torque from the clutch input side to the clutch output side and therefore from the crankshaft to the drivable wheel is selectively producible,
   the transmission of torque from the clutch input side to the clutch output side is rendered possible as soon as at least one of the two clutches is closed,
   the torsional oscillation reducing device is arranged downstream of the clutch assembly with regard to the transmission of torque from the crankshaft in the direction of the drivable wheel, and
   the clutch input side is non-rotatably connected to the crankshaft and the clutch output side is non-rotatably connected to the torsional oscillation reducing device.

2. The drive apparatus for a motor vehicle according to claim 1, wherein
   the positive-locking clutch is embodied as a zero backlash positive-locking clutch with the result that, in the closed state of this clutch, torque may be transmitted with zero backlash from the clutch input side to the clutch output side.

3. The drive apparatus for a motor vehicle according to claim 2, wherein
   the positive-locking clutch is embodied as a gear clutch, in that a positive-locking element is movable by way of a positive-locking actuator in order to produce a torque-conducting connection to the positive-locking clutch, and
   the positive-locking element is embodied in a conical manner at least in sections in a region which is configured so as to form the selective torque-conducting connection.

4. The drive apparatus according to claim 1, wherein the positive-locking clutch is a self-retaining clutch.

5. The drive apparatus according to claim 1, wherein the frictional-locking clutch is a single disk clutch or a multi-disk clutch having at least one or a plurality of frictional lamellae for selective transmission of torque.

6. The drive apparatus according to claim 1, wherein the positive-locking clutch is a normally closed clutch and the frictional-locking clutch is a normally open clutch.

7. The drive apparatus according to claim 1, wherein
   a maximum frictional-locking torque is transmittable from the clutch input side to the clutch output side using solely the frictional-locking clutch, and
   a maximum positive-locking torque is transmittable from the clutch input side to the clutch output side using solely the positive-locking clutch, and the positive-locking torque is greater than the frictional-locking torque.

8. The drive apparatus according to claim 1, wherein the torsional oscillation reducing device comprises a primary side and a secondary side,
   the primary side is connected to the secondary side in a torsionally-flexible manner in order to reduce torsional oscillations, and
   the clutch output side is non-rotatably connected to the primary side.

9. The drive apparatus according to claim 8, wherein
   the clutch output side is integrated into the primary side of the torsional oscillation reducing device such that said clutch output side and said torsional oscillation reducing device are embodied as a single part with one another.

10. A drive system for a hybrid vehicle, comprising:
    a drive apparatus according to claim 1;
    a separating clutch;
    an electromechanical energy converter; and
    a shiftable transmission, wherein
    with regard to the transmission of torque from the crankshaft to the drivable wheel, the electromechanical energy converter is arranged upstream of the shiftable transmission and downstream of the torsional oscillation reducing device and the separating clutch is arranged between the electromechanical energy converter and the torsional oscillation reducing device, and
    the separating clutch is configured so as to selectively interrupt a torque-conducting connection between the torsional oscillation reducing device and the electromechanical energy converter.

11. The drive system according to claim 10, further comprising:
    a transmission clutch arranged in the shiftable transmission, wherein
    the shiftable transmission comprises a transmission input shaft and a transmission output shaft,
    the transmission ratio between these transmission shafts is changeable, and
    the transmission clutch is configured so as to selectively interrupt a torque-conducting connection between the drivable wheel and the electromechanical energy converter.

12. A method for operating a drive system for a hybrid vehicle with an internal combustion engine, the drive system comprising:
    a drive apparatus having an crankshaft for outputting a drive power; a torsional oscillation reducing device, which is configured so as to reduce torsional oscillations and so as to transmit drive power from the crankshaft in a direction of a drivable wheel of the motor vehicle; and a clutch assembly having a clutch input side, a clutch output side, a positive-locking clutch and a frictional-locking clutch,
    a separating clutch;
    an electromechanical energy converter; and
    a shiftable transmission,
    wherein the method comprises:
    during a pulse start of the internal combustion engine in which the crankshaft is accelerated from a standstill to a starting rotational speed utilizing energy that is stored in the torsional oscillation reducing device, the frictional-locking clutch is transferred into a closed state or is held in this closed state, and
    during said accelerating procedure, the positive-locking clutch is transferred into an opened state or at least temporarily or permanently held in this opened state, and
    after the pulse start in a fired operation of the internal combustion engine, in which drive power may be output from the crankshaft in the direction of the drivable wheel, the positive-locking clutch is transferred into a closed operating state or is held in this closed operating state.

13. The method for operating an internal combustion engine according to claim 12, wherein during the fired operation of the internal combustion engine, the frictional-locking clutch is at least temporarily or permanently transferred into an opened state or is permanently held in this opened state.

\* \* \* \* \*